(12) United States Patent
Cheng

(10) Patent No.: US 6,189,122 B1
(45) Date of Patent: *Feb. 13, 2001

(54) METHOD AND APPARATUS FOR CONTROLLING DATA RETRANSMISSION

(75) Inventor: Mark W Cheng, Colleyville, TX (US)

(73) Assignee: Nokia Mobile Phones Ltd, Espoo (FI)

( * ) Notice: Under 35 U.S.C. 154(b), the term of this patent shall be extended for 0 days.

This patent is subject to a terminal disclaimer.

(21) Appl. No.: 09/513,388

(22) Filed: Feb. 25, 2000

Related U.S. Application Data

(63) Continuation of application No. 09/034,196, filed on Mar. 3, 1998, now Pat. No. 6,076,181.

(51) Int. Cl.⁷ ............... G08C 25/02; H04L 1/18
(52) U.S. Cl. ............. 714/748; 714/749; 370/216
(58) Field of Search ............. 714/708, 748, 714/749, 750, 751, 763, 764; 340/825.05, 825.5; 370/216, 223, 224, 242, 324, 374, 402

(56) References Cited

U.S. PATENT DOCUMENTS

| | | | |
|---|---|---|---|
| 4,630,267 | * 12/1986 | Costes et al. ............ | 370/324 |
| 4,973,953 | * 11/1990 | Shimokawa et al. ........ | 340/825.05 |
| 5,031,179 | * 7/1991 | Yoshida et al. ............ | 714/748 |
| 5,896,402 | * 4/1999 | Kurobe et al. ............ | 714/748 |

* cited by examiner

Primary Examiner—Emmanuel L. Moise
(74) Attorney, Agent, or Firm—Brian T. Rivers

(57) ABSTRACT

A method and apparatus for controlling a retransmission in a telecommunications system. A pointer, V(P), that points to the upper bound of retransmitted data frames in a receiver buffer is introduced. A list includes at least one entry indicating a missed data frame for which a retransmission request has been transmitted. The entry is associated with a retransmission/abort timer that is started upon transmission of the retransmission request for the data frame. Once a retransmission timer is started, any received data frame type, whether valid or not, is counted in the incrementation of the retransmission/abort timer for an unreceived data frame. However, if the received data frame is not a valid data frame, any expiration action on the retransmission/abort timer is disabled. Also, anytime any valid frame is received, an expiration action may be taken on the retransmission timer of unreceived data frames having a sequence number less than V(P).

15 Claims, 3 Drawing Sheets

METHOD AND APPARATUS FOR CONTROLLING DATA RETRANSMISSION

This application is a continuation of U.S. application Ser. No. 09/034,196, filed on Mar. 3, 1998, now U.S. Pat. No. 6,076,181.

FIELD OF THE INVENTION

This invention relates to telecommunications systems, and, more particularly, to a method and apparatus for controlling data retransmission in a telecommunications system.

BACKGROUND OF THE INVENTION

Major cellular telecommunications system types include those operating according to the Global Services for Mobile (GSM) Standard, the TIA/EIA/IS-95 Mobile Station-Base Station Compatibility Standard for Dual Mode Wide Band Spread Spectrum Cellular Systems (IS-95), the TIA/EIA/IS-136 Mobile Station-Base Station Compatibility Standard (IS-136), and the TIA/EIA 553 Analog Standard (AMPS/TACS). Other major cellular systems include those operating in the personal communications system (PCS) band according to the IS-95 based ANSI-J-STD-008 1.8–2.0 GHz standard or those operating according to the GSM based PCS1900 (1900 MHz frequency range) standard.

Currently, each of the major cellular system standards bodies is implementing data services into its digital cellular specifications. A data service specification has been finalized for GSM, and data service specifications compatible with the IS-95 and IS-136 standards are being prepared. The IS-95 data service standard is contained in the TIA/EIA document, "Data Service Options for Wideband Spread Spectrum Systems," PN-3676.1-PN-3676.6, which is to be published as TIA/EIA/IS-707.1-TIA/EIA/IS-707.6 (IS-707).

In an IS-707 based system, a radio link protocol (RLP) is utilized to provide an octet stream service over IS-95 forward and reverse traffic channels. The RLP is defined in Section IS-707.2 of IS-707. Each octet of the RLP comprises 8 bits of digital data. The octet stream service carries the variable length data packets of the point-to-point protocol layer. The RLP divides the point-to-point protocol packets into IS-95 traffic channel frames for transmission. The IS-95 traffic channel frames form the physical layer transmission frames. There is no direct relationship between point-to-point protocol packets and IS-95 frames. A large packet may span several IS-95 traffic channel frames, or a single traffic channel frame may include all or part of several point-to-point packets. The RLP does not take the higher level traffic channel framing into account but operates on a featureless octet stream, delivering the octets to the IS-95 multiplex sublayer for transmission in the order the octets are received from the point-to-point layer. The data may be transmitted on the traffic channel as primary traffic or, for example, along with speech, as secondary traffic. The IS-707 RLP generates and supplies one frame to the IS-95 multiple sublayer every 20 msec. The size of the RLP frame depends on the type of transmission frame available for transmitting the RLP frame.

The RLP utilizes RLP control frames to control the transmission of data and RLP data frames for the transmission of data at the RLP level.

The format of RLP control and data frames is defined so that each RLP frame includes an 8-bit sequence number field (SEQ). Each RLP data frame SEQ field contains the sequence number of that particular data frame. The sequence numbers are used to identify each received data frame and allow determination of data frames that have not been received. The RLP control frame SEQ field is not used to indicate the sequence number of the control frame but contains the next data frame sequence number to allow quick detection of erased data frames.

Each RLP data frame includes a number of data bits, with a maximum number of data bits allowed for each frame. The maximum number of data bits allowed in a data frame depends upon the IS-95 multiplex subchannel used and the transmission frame available. The range can vary. For example, for primary traffic on the traffic channel, using multiplex option 2 at IS-95 full rate, the maximum number of data bits allowed is 266; and for primary traffic on the traffic channel using multiplex option 1 at IS-95 half rate, the maximum number of data bits allowed is 80. When fewer than the maximum number of bits are transmitted in a frame, padding is used to fill out the data field. Each RLP data frame also includes an RLP frame type (CTL) field and a data length (LEN) field. The LEN field indicates the length of the data in the frame in octets. For unsegmented data frames, the CTL frame is one bit and is set to 0. For segmented data frames, the CTL frame contains 4 bits and can be set to indicate whether the data in the frame includes the first LEN octets, the next LEN octets, or the last LEN octets of the segmented data frame.

The RLP control frame may function as a negative acknowledgment (NAK) RLP control frame to request retransmission of unreceived data frames. A NAK RLP control frame includes a 4-bit frame type (CTL) field, a 4-bit length (LEN) field, an 8-bit FIRST field, an 8-bit LAST field, a reserved field (RSVD), a frame check sequence field (FCS) and padding. An RLP control frame having the frame type field set to indicate negative acknowledgment (NAK) may then be used to request retransmission of a particular data frame or a particular sequence of data frames. For example, a mobile station expecting a data frame having a particular sequence number would transmit a NAK control frame to the base station if the mobile determined that the data frame was missed from the sequence numbers of received RLP frames. The FIRST and LAST fields of the RLP NAK control frame are used to indicate the particular data frame or sequence (indicated as a range beginning at the sequence number indicated by the FIRST field and ending at the sequence number indicated by the LAST field) of data frames that are requested to be retransmitted. In IS-707, the number of requests for retransmission of a data frame is a set number, and the initiation of subsequent requests for retransmission after the initial NAK control frame is sent is controlled by a NAK retransmission timer. When RLP frames are carried as primary or secondary traffic, the retransmission timer is implemented as a frame counter. The NAK retransmission counter for a data frame is started upon the transmission of a NAK RLP control frame requesting retransmission of that data frame.

If the data frame has not arrived at the receiver when its NAK retransmission timer expires, the receiver sends a second NAK control frame requesting retransmission of that data frame. This NAK control frame is transmitted twice. The NAK retransmission timer for this data frame is then restarted. If the data frame has not arrived at the receiver when its NAK retransmission timer has expired twice, the receiver sends a third NAK control frame requesting retransmission of that data frame. Each NAK control frame transmitted as the result of a retransmission timer expiring a second time is transmitted three times.

A NAK abort timer is then started in the receiver upon transmission of the third NAK control frame. The NAK abort timer is implemented and expires identically to the NAK retransmission timer. If the data frame has not arrived at the receiver when its NAK abort timer has expired, the NAK is aborted and no further NAK control frames are transmitted for that data frame.

The IS-707 NAK retransmission scheme results in a maximum number of three retransmission requests that include a maximum number of six NAK RLP control frames being transmitted for a particular unreceived data frame.

In proposed medium or high data rate CDMA systems a much wider range of data rates may be used to carry data traffic as compared to an IS-95/IS-707 based system. For example, a second generation IS-95 system (IS-95B) has been standardized and utilizes a fundamental channel and one or more supplemental channels on a link to carry data traffic. The fundamental and supplemental channels carry data in parallel on orthogonal CDMA code channels. The IS-95B system may transmit at much higher data rates than an IS-95/IS-707 based system. These systems also include the use of dynamic data rates, where the data rate and number of channels can change during the call to provide a desired data rate.

If a transmitter in an IS-95B system is using multiple supplemental channels to transfer data frames and has a large number of retransmitted data frames queued up, removing supplemental channels, for higher priority applications or otherwise, could slow down the time it takes to transmit a retransmitted data frame. Since current IS-707 does not advance the retransmission or abort timer when only a retransmitted data frame or frames are received, if a retransmitted frame is lost in retransmission, the expiration of the timer is delayed until the next new data frame is received. This could cause delay if large numbers of data frames are being retransmitted. If the amount of retransmissions necessary in the particular system and situation were large, there could be adverse effects as far as slowing down transfer of data.

OBJECTS OF THE INVENTION

It is an object of this invention to provide a method and apparatus for controlling a retransmission/abort timer in a telecommunications system that overcomes the foregoing and other problems.

Another object of this invention is to provide a method and apparatus for controlling a retransmission/abort timer that minimizes the occurrences of unnecessary retransmission requests for unreceived data frames from a receiver in a telecommunications system having dynamic channel allocation and data rates.

Another object of this invention is to provide a method and apparatus for controlling a retransmission/abort timer that timely detects a missing data frame and also minimizes the occurrences of timer expiration that occur later than necessary in a receiver in a telecommunications system having dynamic channel allocation and data rates.

A further object of this invention is to provide a pointer for a data buffer in a receiving transceiver, wherein the pointer is utilized to detect missing retransmission data frames and provide on time retransmission/abort timer expiration.

SUMMARY OF THE INVENTION

The present invention provides a method and apparatus for controlling data retransmission in a telecommunications system. The method and apparatus allows a receiver in a telecommunications system having dynamic channel allocation and data rates to timely detect a missing data frame from a received sequence of data frames and minimizes the delay of retransmission requests and an early retransmission abort timer expiration for unreceived data frames. The method and apparatus has application in a system having a receiver buffer for buffering received data frames in a receiving device and at least one retransmission and/or abort timer, where a retransmission/abort timer is started upon the transmitting of each retransmission request for a data frame from the receiving device.

In the method and apparatus, a novel pointer, V(P), that points to the upper bound of the retransmitted data frames in the receiver buffer id introduced. The pointer indicates the latest data frame or highest sequence number of data frames of the data frames in a receiver buffer that have been received in response to a retransmission request. Also in the method and apparatus, the incrementation and the expiration of the retransmission/abort timer for each unreceived data frame are separated as process steps. Once the retransmission/abort timer is started, any received data frame type, whether valid or not, is counted in the incrementation of the retransmission/abort timer for an unreceived data frame. However, if the received data frame is not a valid frame, any expiration action on the retransmission/abort timer is disabled. This allows any frame type to be counted against the retransmission timer subsequent to a retransmission request.

The pointer V(P) is used to prevent unnecessary extension of a retransmission/abort timer's expiration period. Anytime a valid frame is received, an expiration action may be taken on the retransmission timer of unreceived data frames having a sequence number less than V(P). Because the retransmitted frames are buffered in the transmitter, the frame with the earliest sequence number is sent first. If the retransmitted data frame having a sequence number less than V(P) were in the transmitter buffer of the transmitting device, then it would be sent first. Without the use of the pointer V(P), a retransmitted data frame would cause an expiration action on the retransmission/abort timer to be delayed.

In an embodiment of the invention, the method and apparatus is implemented into a cellular telecommunications system having an RLP data service protocol layer based on IS-707.2. A receiving transceiver may be either a mobile station receiving RLP frames from a base station or a base station receiving RLP frames from a mobile station. The data service protocol layer includes a receiver buffer for buffering received data frames for controlling the retransmission/abort timers and the passing of the data to the next higher protocol level in a receiving device. The receiver buffer utilizes a new retransmission pointer V(P), in combination with two IS-707.2 sequence number pointers, V(R) and V(N). V(P) contains the sequence number of the most recently received data frame in the receiver buffer that was received in response to a retransmission request (retransmitted data frame). V(R) contains the expected value of the sequence number of the next new frame to be received, and V(N) contains the sequence number of the next needed data frame that was not received in sequence. In the embodiment retransmission/abort timers are implemented for each retransmission request. A NAK list entry is created for each data frame for which a retransmission request has been transmitted. Each NAK list entry is associated with a retransmission/abort timer stored upon a retransmission request for the data frame.

When an RLP frame is received in the receiving transceiver, the frame is processed and the RLP then processes the NAK list entries. A NAK list entry having an expired transmission/abort timer is selected in the process. The NAK list entries are processed for each new valid idle frame and any valid or invalid data frame received. A NAK list entry having an active retransmission or abort timer is processed by first determining if the timer has not expired from a previous increment made when no expiration action took place. In the embodiment, a retransmission/abort timer may be incremented for any received frame. If the timer has not previously expired, the timer is incremented.

If the increment causes the timer to expire or if the timer had already expired, it is determined if a new data frame has been received; or if a new data frame has not been received, it is determined if V(P) is set to a valid sequence number and the NAK entry's sequence number is less than V(P). If either condition holds true, a timer expiration action is initiated. When used to time retransmission, the expiration action of the retransmission/abort timer causes another NAK frame transmission for the NAK entry, and either restarts the retransmission timer or, if the retransmission/abort timer has been already started a predetermined number of times as a result of a retransmission request being transmitted, starts the abort action timing for the NAK entry. For the abort timing, the expiration of the retransmission/abort timer causes the removal of the NAK entry from the NAK list and transfer of appropriate data frames in the buffer to the next higher protocol layer.

BRIEF DESCRIPTION OF THE DRAWINGS

The above set forth and other features of the invention are made more apparent in the ensuing Detailed Description of the Invention when read in conjunction with the accompanying drawings wherein.

DETAILED DESCRIPTION OF THE INVENTION

Figure 1:
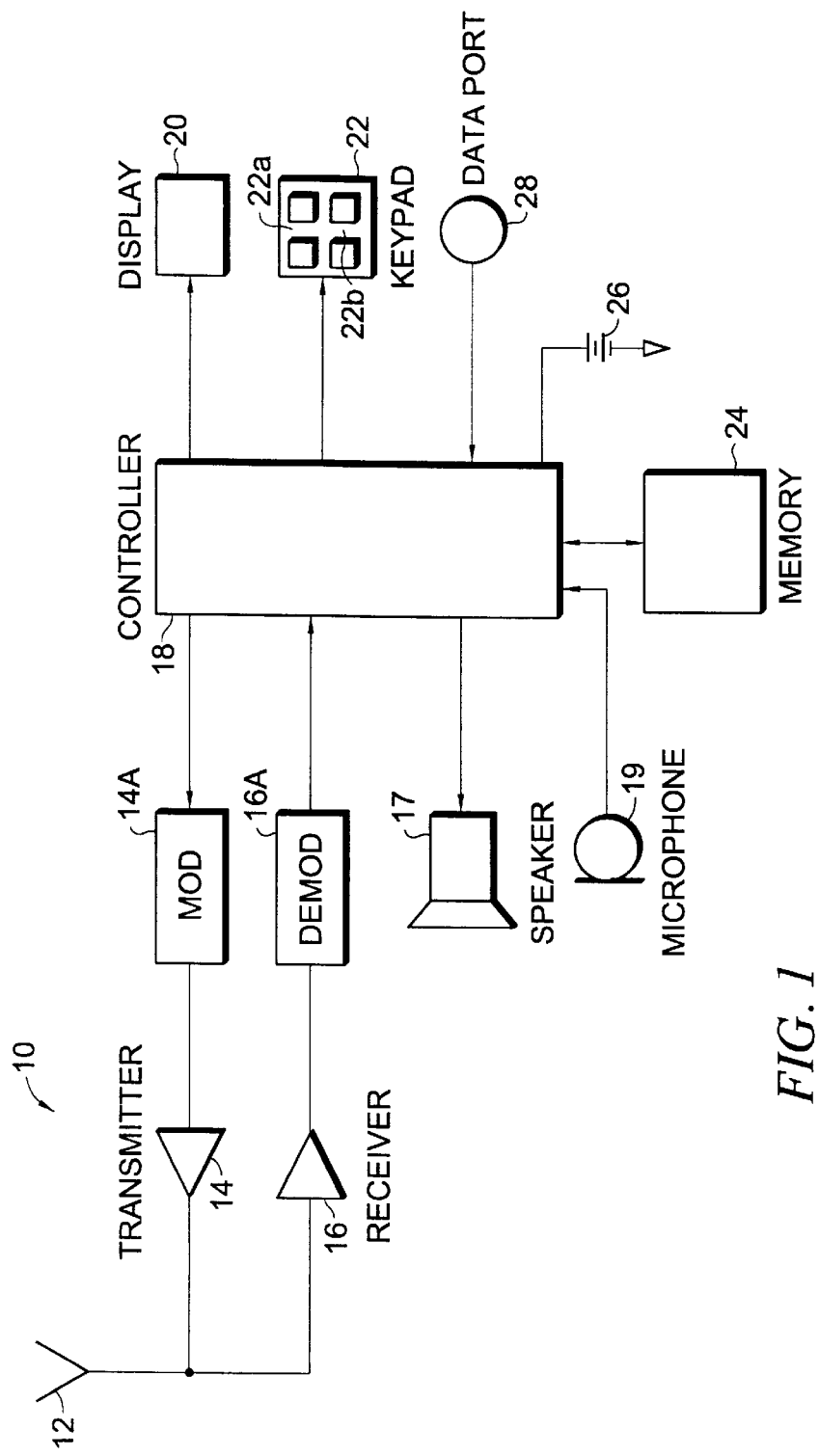
FIG. 1 is a block diagram of a cellular terminal that is suitable for practicing this invention.
Figure 2:
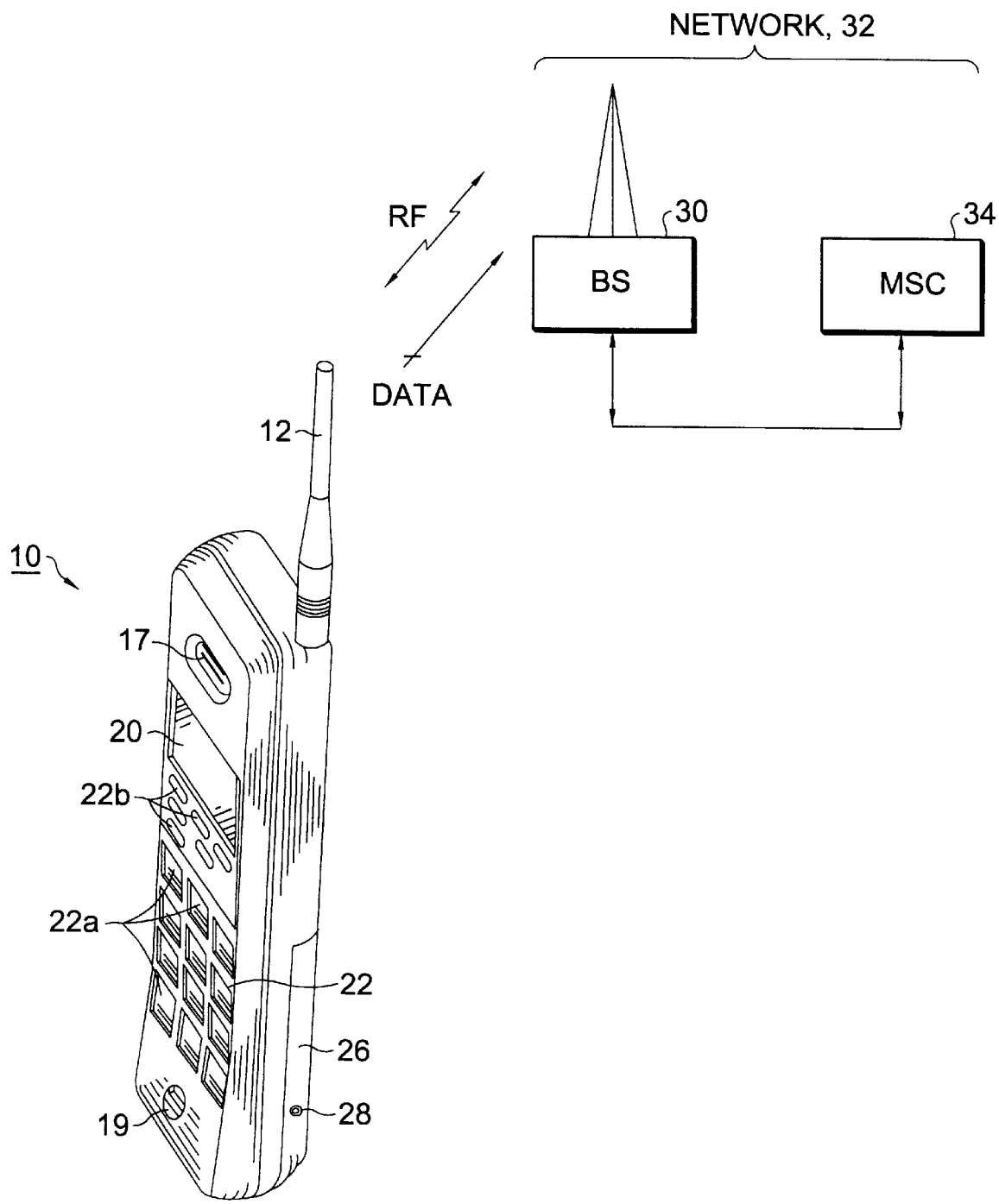
FIG. 2 depicts the terminal of FIG. 1 in communication with a CDMA cellular network.

Referring now to FIGS. 1 and 2, therein are illustrated a wireless user terminal or mobile station (MS) 10 and cellular network 32 that is suitable for practicing this invention. The mobile station 10 includes an antenna 12 for transmitting signals to and receiving signals from a base site or base station (BS) 30. The BS 30 is a part of cellular network 32 that includes a mobile switching center (MSC) 34. The MSC 34 provides a connection to landline trunks when the MS 10 is involved in a call.

The MS 10 includes a modulator (MOD) 14A, a transmitter 14, a receiver 16, a demodulator (DEMOD) 16A, and a controller 18 that provides signals to and receives signals from modulator 14A and demodulator 16A, respectively. These signals may include signaling information and also speech, data and/or packet data transmitted between MS 10 and BS 30 in accordance with the air interface standard of the applicable cellular system.

Controller 18 may be comprised of a digital signal processor device, a microprocessor device, and various analog-to-digital converters, digital-to-analog converters, and other support circuits. The control and signal processing functions of the mobile station are allocated between these devices according to their respective capabilities. MS 10 also includes a user interface comprised of a conventional earphone or speaker 17, a conventional microphone 19, a display 20, and a user input device, typically a keypad 22, all of which are coupled to the controller 18. The keypad 22 includes the conventional numeric (0–9) and related keys (#, *) 22a, and other keys 22b used for operating the mobile station 10. These other keys 22b may include, for example, a SEND key, various menu scrolling and soft keys, and a PWR key. The mobile station 10 may also include a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 may store the values of various cellular system parameters and the number assignment module (NAM). An operating program for controlling the operation of controller 18 is also stored in the memory 24 (typically in a ROM device). The memory 24 may also store or buffer data prior to transmission or after reception. The memory 24 also includes routines for implementing the method and apparatus of controlling a retransmission/abort timer according to the described embodiment of the invention.

Mobile station 10 may also function as a data terminal for transmitting or receiving packet data. As such, in this case MS 10 may be connected to a portable computer or a fax machine through a suitable data port (DP) 28.

BS 30 also includes the necessary transmitters and receivers to allow signal exchange with MS 10. Controllers, processors and associated memories that may be located in BS 30 or MSC 34 provide control of BS 30 and MSC 34 and implement routines for the method and apparatus of controlling a retransmission/abort timer according to the described embodiment of the invention.

In the embodiment of this invention MS 10 and network 32 operate using a direct spread, code division multiple access (DS-CDMA) system that may be based on the IS-95 system standard. The network may operate in the 800 MHz frequency range or in the 1.8–2.0 GHz range. The network may provide a service option feature based on the IS-707 data service standard and may also use high speed data techniques that have been proposed for CDMA-based systems to provide higher speed data transmission than is presently provided by the present IS-95A and IS-707 standards.

For example, the method and apparatus may be implemented for advantage in a system as specified in the TIA/EIA/SP-3693 Mobile Station-Base Station Compatibility Standard for Dual Mode Wide Band Spread Spectrum Cellular System (IS-95), which is to be published as IS-95B. In IS-95B, parallel fundamental and supplemental Walsh code channels are used to carry parallel data transmissions to provide higher speed data than available in IS95A, with the number of supplemental channels being dynamically adjustable during a transmission to provide dynamic rate high speed data.

Figure 3:
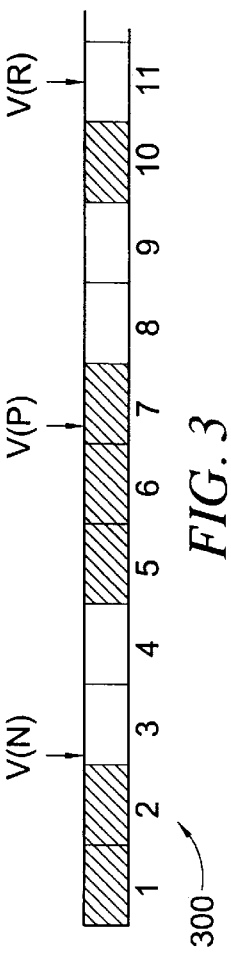
FIG. 3 is a pictorial representation of a receiver buffer for processing data frames and controlling a retransmission timer according to an embodiment of the invention.

Referring now to FIG. 3, therein is a pictorial representation of a receiver buffer 300 for processing data frames and controlling a retransmission timer according to the invention. Receiver buffer 300 is located in the receiving transceiver which may be in either base station BS 30 or mobile station MS 10. FIG. 3 shows a receiver buffer as including RLP data frames represented by the shaded areas indicated by sequence numbers 1, 2, 5, 6, 7 and 10. The empty areas indicated by sequence numbers 3, 4, 8, 9 and 11 indicate that RLP data frames having these sequence numbers have not been received. The sequence numbers 1–11 are representative only and may be any consecutive sequence of sequence numbers in a series of received data frames. In FIG. 3, RLP data frames 1 and 2 have been received in sequence, RLP data frames 5, 6, 7 and 10 have been received out of sequence. The data frames in buffer 300 may or may not be retransmitted data frames that were missed and transmitted in response to a retransmission request.

Three pointers, V(N), V(P) and V(R), are associated with receiver buffer 300. V(N) is an IS-707 pointer that indicates the sequence number of the next needed data frame that was not received in sequence. V(R) is an IS-707 pointer that indicates the expected sequence number of the next new data frame to be received, i.e., the next data frame in sequence after the received data frame having the highest sequence number in receiver buffer 300. A data indicator, NEW_DATA, may be used to determine whether or not a new data frame has been received. NEW_DATA is a proposed IS-707 variable that is set to 1 if the received RLP frame is a valid idle RLP frame or if the received RLP frame is a valid data frame whose sequence number is greater than or equal to V(R). The information provided by NEW_DATA is used in a novel manner in the embodiment. New pointer V(P) points to the sequence number of the upper bound (highest sequence number) for data frames for which a retransmission request has been sent and which has been received in the receiving transceiver.

In the embodiment V(P) is used with the information provided by NEW_DATA to process a NAK list entry to determine an appropriate action to take on the retransmission timer or abort timer for the NAK list entry according to the invention.

Figure 4:
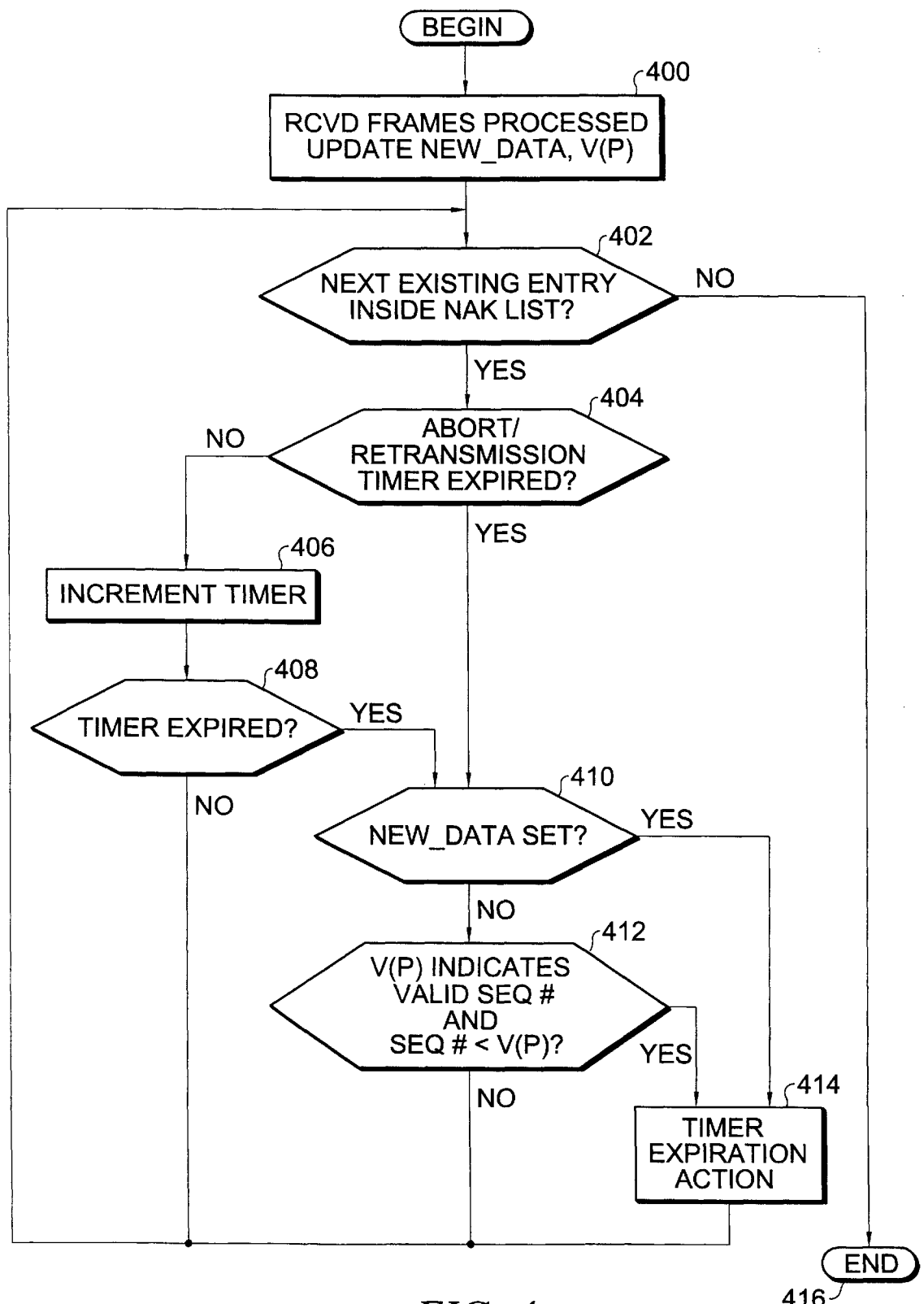
FIG. 4 is a flow chart illustrating process steps for controlling a retransmission timer according to an embodiment of the invention.

Referring now to FIG. 4, therein is a flow chart illustrating process steps for controlling a retransmission/abort timer according to an embodiment of the invention. FIG. 4 illustrates the processing of received RLP data frames. The process of FIG. 4 is performed within the receiver of the transceiver, MS 10 or BS 30, that is receiving RLP data frames as point-to-point protocol over the physical transmission layer. The process is started and performed utilizing pointer information associated with queue 300 of FIG. 3 for every 20 msec. period in which a physical layer transmission frame is received.

The embodiment utilizes a negative acknowledgment (NAK) type retransmission procedure where a receiving transceiver device transmits the sequence number of a data frame not received in sequence in a NAK frame to request retransmission of the data frame from the transmitting transceiver device. When a receiving transceiver transmits a NAK frame requesting retransmission for a particular data frame, the sequence number of that data frame is placed in a NAK list in the receiver. A retransmission/abort timer is maintained for each data frame in the NAK list. In the embodiment, the retransmission/abort timer includes a retransmission timer used to time additional NAK frame transmissions that are subsequent to an initial NAK frame transmission, and an abort timer that is used to indicate that the data frame has not been received in response to retransmission requests and that the retransmission procedure is to be aborted. The retransmission timer may be started a predetermined number of times before it can expire. The abort timer is started upon the expiration of the retransmission timer. The retransmission/abort timer may be implemented using a single or using multiple timers in hardware or software.

The process begins at step 400 where a received RLP frame is processed and, if the received RLP frame is a valid RLP data frame, placed in queue 300. Upon receiving the RLP frame, NEW_DATA is set to 1 if the received RLP frame is a valid frame with a sequence number greater or equal to V(R). V(P), V(N) and V(R) are then updated if the received RLP frame is placed in queue 300. Next, at steps 402 through 408, the next NAK list entry having an expired retransmission/abort timer is selected for processing according to the invention.

At step 402 it is determined whether a NAK entry exists in the NAK list. If no NAK list entry exists, the process moves to step 416 and ends. If a NAK list entry exists, the process moves to step 404. At step 404 it is determined whether the retransmission/abort timer for the NAK list entry is expired. If at step 404 it is determined that the retransmission/abort timer is expired, the process moves to step 410. If, however, at step 404 it is determined that the retransmission/abort timer is not expired, the process moves to step 406. At step 406 the retransmission/abort timer is incremented. Next at step 408 it is determined whether the abort-retransmission timer is expired after being incremented. If at step 408 it is determined that the retransmission/abort timer is expired, the process moves to step 410. Otherwise, the process moves back to step 402 to process any remaining NAK list entries.

At step 410 it is determined whether the indicator $NEW_{13}DATA$ is set to indicate that new data was received. If it is determined that NEW_DATA is set, the process moves to step 414 where a retransmission/abort timer expiration action is taken. If, however, at step 410 it is determined that NEW_DATA is not set to indicate that new data was received, the process moves to step 412. At step 412 it is determined if V(P) is set to indicate that a retransmitted RLP data frame has been received and that the sequence number of the NAK entry is less than the sequence number indicated by V(P). If V(P) indicates that a retransmitted RLP data frame has been received and the NAK entry's sequence number is less than V(P), the process moves to step 414 where a retransmission/abort timer expiration action is taken. Otherwise, the process moves back to step 402 to process any remaining NAK list entries.

The retransmission/abort timer expiration action taken is according to IS-707, i.e., a NAK frame is transmitted for expiration of the retransmission timer or all data frames in the buffer having a sequence number less than the NAK list entry are sent to the next higher protocol level for abort timer expiration.

The invention has application to various types of telecommunications systems. For example, the method and apparatus may be implemented in other types of digital telecommunications systems which have a retransmission feature by which unreceived data frames are retransmitted to a receiving transceiver. Accordingly, although the invention has been particularly shown and described with respect to preferred embodiments thereof, it will be understood by those skilled in the art that changes in form and details may be made therein without departing from the scope and spirit of the invention.

What is claimed is:

1. A method for receiving data frames in a transceiver, said method comprising the steps of:

detecting that a first selected frame has not been received in a sequence of a first plurality of frames transmitted to the transceiver;

transmitting a retransmission request from the transceiver, said retransmission request requesting retransmission of said first selected frame to the transceiver;

starting a timer in response to transmitting said retransmission request;

receiving a second plurality of frames at the transceiver and buffering said second plurality of frames in a buffer;

setting a pointer that indicates the highest sequence number of frames in said buffer received as a result of retransmission requests other than said retransmission request requesting retransmission of said first selected frame;

receiving a second selected frame at the transceiver subsequent to receiving said second plurality of frames, placing said second selected frame in said buffer, incrementing said timer and updating said pointer; and determining whether an expiration action should be taken on said timer based on said pointer.

2. The method of claim 1, wherein said step of determining comprises determining whether said pointer indicates a sequence number greater than a sequence number of said first selected frame.

3. The method of claim 2, wherein said method further comprises, in response to a determination that said pointer indicates a sequence number greater than a sequence number of said first selected frame, the step of taking an expiration action on said timer.

4. The method of claim 2, wherein said method further comprises, in response to a determination that said pointer does not indicate a sequence number greater than the sequence number of said first selected frame, the step of taking no expiration action on said timer.

5. The method of claim 2, wherein said method further comprises the step of determining if said second selected frame is a valid data frame.

6. The method of claim 5, wherein said method further comprises, in response to a determination that said pointer indicates a sequence number greater than the sequence number of said first selected frame and a determination that said second selected frame is a valid data frame, taking an expiration action on said pointer.

7. A method for receiving data frames in a transceiver, said method comprising the steps of:

detecting that a first at least one frame has not been received in a sequence of a second at least one frame transmitted to the transceiver;

transmitting a first at least one retransmission request from the transceiver, each said first at least one retransmission request associated with a separate frame of said first at least one frame;

starting at least one timer in response to transmitting said first at least one retransmission request, each said at least one timer associated with a separate retransmission request of said first at least one retransmission request;

receiving a third at least one frame at the transceiver and buffering said third at least one frame in a buffer;

setting a pointer that indicates the highest sequence number of any frame in said buffer received as a result of a retransmission request;

receiving a fourth at least one frame at the transceiver, placing said fourth at least one frame in said buffer and updating said pointer; and determining whether an expiration action should be taken on each said at least one timer, based on said pointer.

8. The method of claim 7, wherein said step of determining comprises the steps of:

determining whether said pointer indicates a sequence number greater than any frame of said first at least one frame; and in response to a determination that said pointer indicates a sequence number greater than any frame of said first at least one frame;

taking an expiration action on the timer of said at least one timer associated with any frame of said at least one frame determined to have a sequence number less than said pointer.

9. The method of claim 7, wherein said step of determining comprises the steps of:

determining whether any timer of said at least one timer has expired; and determining, for selected frames of said first at least one frame associated with an expired timer, whether said pointer indicates a sequence number greater than the sequence number of each of said selected frames of said first at least one frame.

10. An apparatus for retransmitting data frames, said apparatus comprising:

a transmitter for transmitting a retransmission request for a first frame;

a buffer for buffering a plurality of second frames;

a receiver for receiving a third frame;

a timer; and a controller, said controller coupled to said receiver, said buffer, said transmitter, and said timer, said controller for starting said timer upon transmission of said retransmission request for said first frame from said transmitter, buffering said plurality of second frames in said buffer and setting a pointer in said memory to indicate the highest sequence number of any of said plurality of second frames in said buffer received as the result of other retransmission requests from said transmitter, said controller further for determining, in response to receiving said third frame at said receiver, if an expiration action on said timer should be taken based on said pointer.

11. The apparatus of claim 10, wherein said controller determines that an expiration action should be taken by determining if said pointer indicates a sequence number greater than the sequence number of said first frame.

12. The apparatus of claim 10, wherein said controller determines that an expiration action should not be taken by determining if said pointer indicates a sequence number less than the sequence number of said first frame.

13. An apparatus for retransmitting data frames, said apparatus comprising:

a transmitter for transmitting at least one retransmission request, each said at least one retransmission request associated with one of a first at least one frame;

a buffer for buffering a second at least one frame;

a receiver for receiving a third at least one frame;

at least one timer; and a controller, said controller coupled to said receiver, said transmitter, and said timer, wherein said controller starts said at least one timer upon transmission of each of said at least one retransmission request, wherein each said at least one timer is associated with a separate retransmission request of said first at least one retransmission request, said controller further buffering said second at least one frame in said buffer and setting a pointer to indicate the highest sequence number of any of said second at least one frame in said buffer received as the result of a retransmission request, said controller further for determining, in response to receiving said third at least one frame at said receiver, if an expiration action on said at least one timer should be taken based on said pointer.

14. The apparatus of claim 13, wherein said controller determines if an expiration action should be taken based on determining whether said pointer indicates a sequence number greater than any frame of said first at least one frame; and in response to a determination that said pointer indicates a sequence number greater than any frame of said first at least one frame, taking an expiration action on the timer of said at least one timer associated with any frame of said at least one frame determined to have a sequence number less than said pointer.

15. The apparatus of claim 13, wherein said controller determines if an expiration action should be taken by determining whether any timer of said at least one timer has expired, and determining, for selected frames of said first at least one frame associated with an expired timer, whether said pointer indicates a sequence number greater than the sequence number of each of said selected frames of said first at least one frame.

* * * * *